US009906659B2

(12) United States Patent
Shimomura

(10) Patent No.: US 9,906,659 B2
(45) Date of Patent: Feb. 27, 2018

(54) PRINTER FOR PRINTING PRODUCT INFORMATION RECEIVED FROM EXTERNAL DEVICE

(71) Applicant: TOSHIBA TEC KABUSHIKI KAISHA, Tokyo (JP)

(72) Inventor: Hiroshi Shimomura, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/411,353

(22) Filed: Jan. 20, 2017

(65) Prior Publication Data

US 2017/0251112 A1 Aug. 31, 2017

(30) Foreign Application Priority Data

Feb. 29, 2016 (JP) ................................. 2016-037687

(51) Int. Cl.
*G06F 15/00* (2006.01)
*G06F 3/12* (2006.01)
*G06K 1/00* (2006.01)
*H04N 1/00* (2006.01)
*G06K 15/02* (2006.01)

(52) U.S. Cl.
CPC ....... *H04N 1/00344* (2013.01); *G06K 15/024* (2013.01); *H04N 1/00334* (2013.01); *H04N 2201/0039* (2013.01); *H04N 2201/0089* (2013.01)

(58) Field of Classification Search
CPC .......... H04N 1/00344; H04N 1/00334; H04N 2201/0039; H04N 2201/0089; G06K 15/024
USPC ............................... 358/1.15, 1.1, 1.14, 1.13
See application file for complete search history.

(56) References Cited

U.S. PATENT DOCUMENTS

2005/0010475 A1* 1/2005 Perkowski ............. G06Q 30/02
705/14.51
2016/0012465 A1* 1/2016 Sharp ..................... G06Q 20/18
705/14.17

FOREIGN PATENT DOCUMENTS

JP 2582234 2/1997

* cited by examiner

*Primary Examiner* — Douglas Tran
(74) *Attorney, Agent, or Firm* — Patterson & Sheridan, LLP

(57) ABSTRACT

According to an embodiment, a printer includes a display device and a controller device. The display device displays one of product information received from an external device and product information recorded in a memory device, as product-information-to-be-printed. When the printer is incapable of receiving the product information from the external device, the controller device controls the display device to display the product information recorded in the memory device, in a display mode indicating that the product-information-to-be-printed is the product information recorded in the memory device.

11 Claims, 8 Drawing Sheets

PRINTER FOR PRINTING PRODUCT INFORMATION RECEIVED FROM EXTERNAL DEVICE

CROSS-REFERENCE TO RELATED APPLICATIONS

This application is based upon and claims the benefit of priority from the prior Japanese Patent Application No. 2016-037687, filed on Feb. 29, 2016, the entire contents of which are incorporated herein by reference.

FIELD

An embodiment described here generally relates to a printer.

BACKGROUND

In the past, label printers that issue labels to be attached on products are used in stores such as supermarkets. A label printer prints product information including the product name, the price, and other information on a label, and issues this label.

For example, under the condition that a product code is input, the label printer receives the newest product information on a product corresponding to the product code from a server device, and records the newest product information in a recording unit. Further, the label printer receives product information from the server device at predetermined timing, and records the product information in the recording unit. In other words, there is a time lag from update of the product information of the server device with the newest information to update of the product information recorded in the recording unit. Meanwhile, under the condition that the label printer is incapable of receiving product information from the server device, the label printer reads the product information recorded in the recording unit of the label printer. The label printer prints the read product information on a label. In other words, the product information printed on a label is sometimes not the newest product information.

However, the label printer does not inform an operator if the product information to be printed on a label is product information obtained from the server device or the recording unit. In other words, the operator who operates the label printer may not recognize if the product-information-to-be-printed is product information recorded in the recording unit of the label printer or received from the server device.

DETAILED DESCRIPTION

Figure 1:
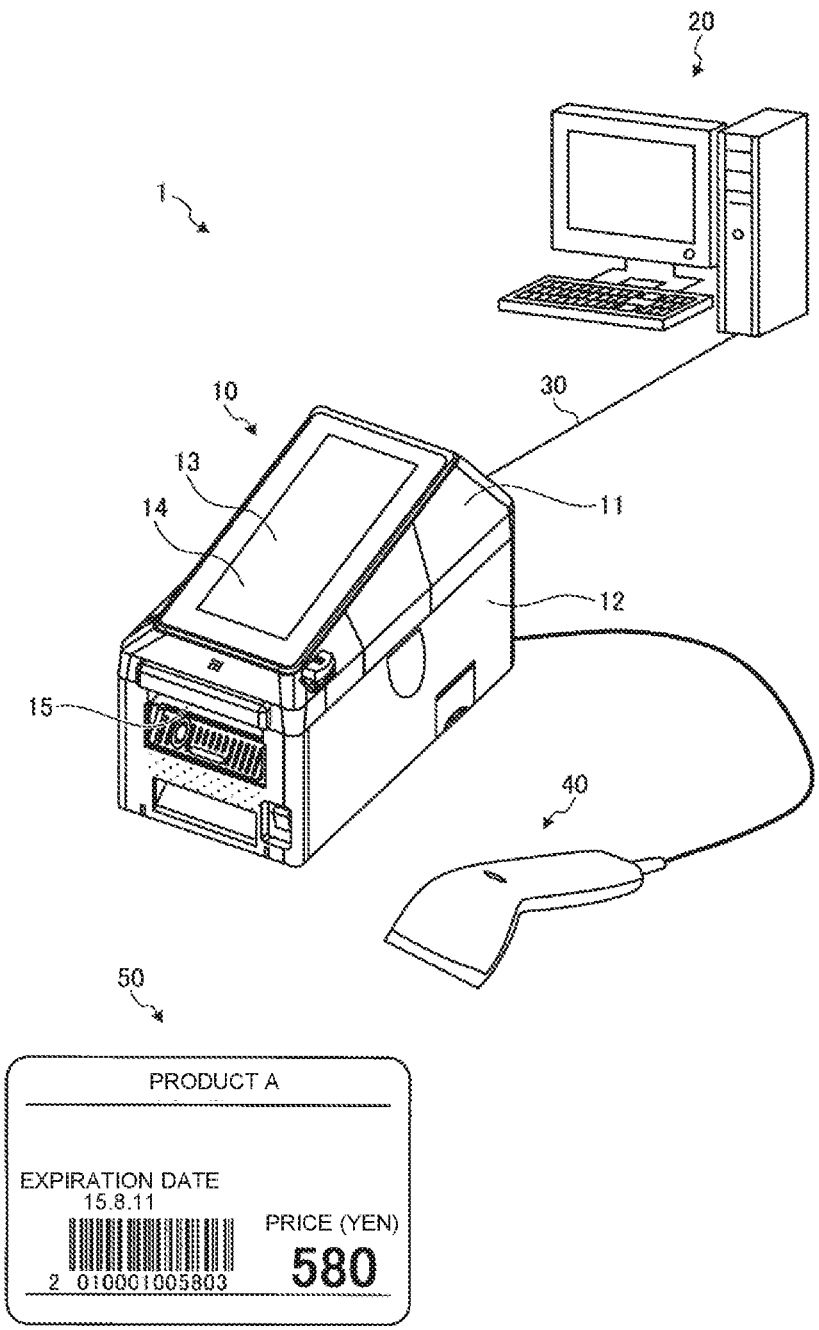
FIG. 1 is a diagram illustrating an example of a configuration of the label printer system of an embodiment.

According to an embodiment, a printer includes an input device, a communication interface, a memory device, a print device, a display device, and a controller device. The input device inputs a product code for identifying a product. The communication interface receives product information from an external device, the product information including information on the product. The memory device records the product information corresponding to the product code, the product information being received from the external device via the communication interface. The print device prints the product information on a recording medium, the product information corresponding to the product code input from the input device. The display device displays one of the product information received via the communication interface and the product information recorded in the memory device, as product-information-to-be-printed to be printed by the print device. The controller device reads, under the condition that the communication interface is incapable of receiving the product information from the external device, the product information corresponding to the product code input from the input device, from the memory device. The controller device controls the display device to display the read product information as the product-information-to-be-printed, in a display mode indicating that the product-information-to-be-printed is product information recorded in the memory device. The controller device further controls the print device to print the product-information-to-be-printed displayed on the display device.

Hereinafter, a printer of an embodiment will be described with reference to the drawings. In the drawings, the same reference symbols show the same or similar units. As described below, the embodiment is applied to a printer that prints information on a product such as a food on a recording medium such as a label, for example, and issues this label. However, the embodiment is not limited to this. The embodiment is applicable to any device that prints various kinds of information on a recording medium.

FIG. 1 is a diagram illustrating an example of a configuration of the label printer system 1 of this embodiment. The label printer system 1 includes the label printer 10 and the store server 20. The label printer 10 is connected to the store server 20 via the network 30. The network 30 is, for example, a wired or wireless in-store LAN (Local Area Network). Further, the label printer system 1 of FIG. 1 includes the one label printer 10 and the one store server 20. Alternatively, the label printer system 1 may include label printers 10 and store servers 20. Further, the label printer system 1 may include one label printer 10 and store servers 20, or label printers 10 and one store server 20.

In the following description, a label on which product information is printed will be collectively referred to as the label 50. Further, a label on which no product information is printed will be simply referred to as a label, which is different from the label 50. The label printer 10 is a printer that issues the label 50 to be attached on a product. The label printer 10 prints product information on a product, on which the label 50 is to be attached, on a label. The label printer 10 includes the top cover 11 and the main cover 12. The top cover 11 is provided on the main cover 12 and is opened/closed. The label printer 10 includes the display device 13 on the top cover 11. The display device 13 is, for example, a liquid crystal display or the like on which the touchscreen 14 is layered. As described later, the display device 13 displays the above-mentioned product information received from the store server 20 or the above-mentioned product information recorded in the memory device 105 as product-information-to-be-printed to be printed by the print device 110. Further, the label printer 10 includes an accommodation device (not shown) and the print device 110 inside the main cover 12. The accommodation device accommodates rolled label sheet. When the top cover 11 is open, the accommodation device is exposed outside of the main cover 12. The label sheet is a base sheet on which labels are attached, for example. The print device 110 prints product information recorded in the PLU file 107 (described later) or product information received from the store server 20 on a label of the label sheet. Specifically, when the label printer 10 is incapable of communicating with the store server 20, the print device 110 prints the product information recorded in the PLU file 107 (described later) on a label. Further, when the label printer 10 is capable of communicating with the store server 20, the print device 110 prints the product information received from the store server 20 on a label. The label printer 10 includes the label issue slot 15 between the top cover 11 and the main cover 12. The label printer 10 dispenses the label 50, on which product information is printed by the print device 110, from the label issue slot 15 and thereby issues the label 50.

The label printer 10 includes input devices. The input devices input a product code for identifying a product. The label printer 10 includes the handy scanner 40 and the touchscreen 14 as the input devices. The touchscreen 14 accepts operations by an operator, and thereby inputs a product code. The handy scanner 40 is connected to the label printer 10. The handy scanner 40 reads a code symbol printed on the label 50 of FIG. 1, for example, and thereby inputs the product code indicated by the code symbol. The code symbol is, for example, a barcode, which is obtained by converting a product code. A product code is identification information for identifying a product. The label 50 of FIG. 1 is an example in which the label printer 10 prints product information on a label. The product information includes, for example, information on the product name, the product price, the manufacturing date, the best-before date, the expiration date, the production area, and the like. Further, the product information may include, for example, a message from a producer or sales staff to a customer, who can be a purchaser of a product. Part of product information on a product, on which the label 50 is to be attached, is printed on the label 50 of FIG. 1. Specifically, as product information, the product name (for example "Product A"), the expiration date (for example "15. 8. 11"), and the product price (for example "580") are printed on the label 50. Further, the above-mentioned code symbol is printed on the label 50.

Next, the hardware configurations of the devices of the label printer system 1 will be described.

Figure 2:
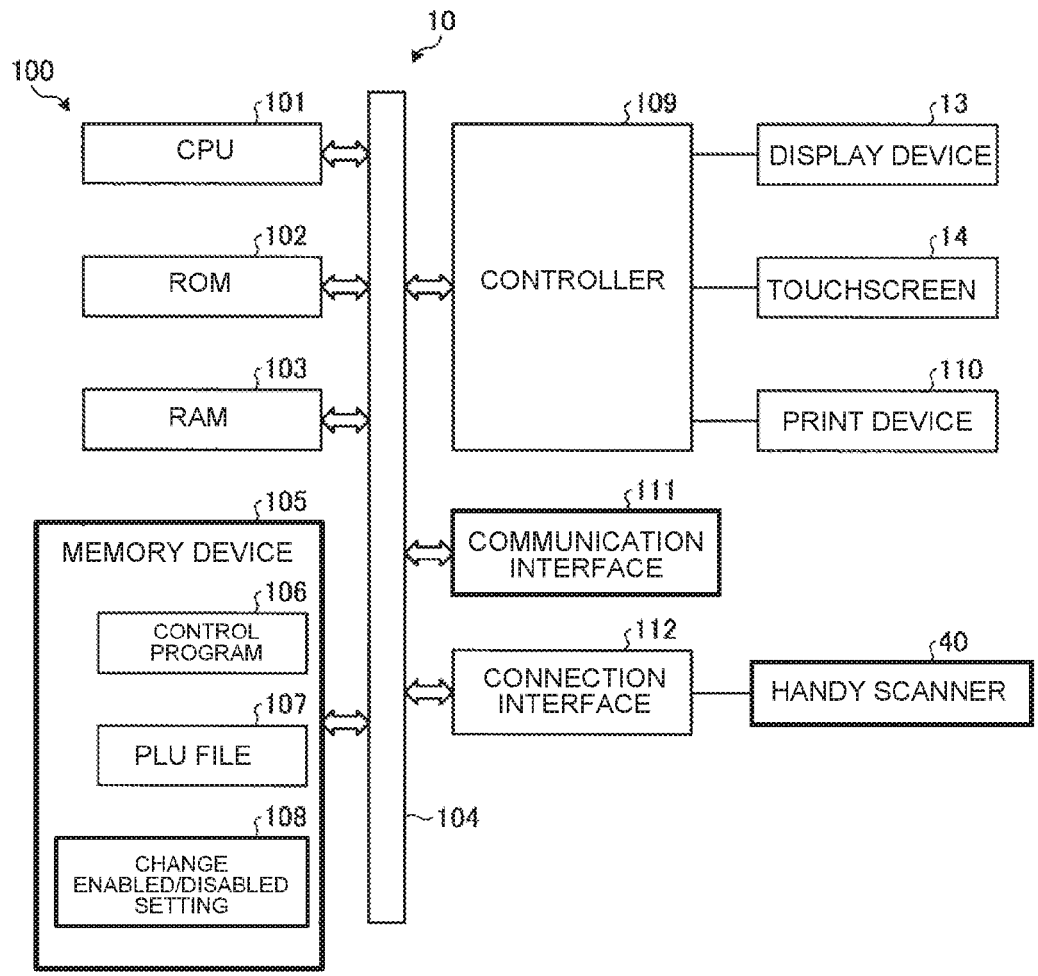
FIG. 2 is a block diagram showing an example of a hardware configuration of the label printer of this embodiment.

FIG. 2 is a block diagram showing an example of a hardware configuration of the label printer 10. The label printer 10 includes the controller device 100 that controls the respective units. The controller device 100 includes the CPU (Central Processing Unit) 101, the ROM (Read Only Memory) 102, and the RAM (Random Access Memory) 103. The CPU 101 is connected to the ROM 102 and the RAM 103 via the bus line 104 including an address bus, a data bus, and the like. The CPU 101 decompresses programs (including the control program 106), which are recorded in the ROM 102 and the memory device 105, in the RAM 103. The CPU 101 operates based on the programs decompressed in the RAM 103, and thereby controls the label printer 10.

The controller device 100 is connected to, via the bus line 104, the memory device 105, the controller 109, the communication interface 111, and the connection interface 112.

The memory device 105 is a nonvolatile memory that records information after power-off such as a flush memory. The memory device 105 records programs including the control program 106, and the like. The control program 106 is a program for realizing the functions of the label printer 10. The memory device 105 records the PLU (Price Look Up) file 107, and the change enabled/disabled setting 108.

The PLU file 107 records, for each product code, product information on the product corresponding to the product code and the update date of the product information in relation with each other. The product information of the PLU file 107 is product information of the PLU file 207 (see FIG. 3), which is transmitted from the store server 20 to the label printer 10. The store server 20 transmits product information of the PLU file 207 to the label printer 10 at predetermined timing. For example, the store server 20 transmits all the product information of the PLU file 207 to the label printer 10 at regular intervals. Further, for example, at timing when the store server 20 receives a request to send the product information corresponding to a predetermined product code from the label printer 10, the store server 20 transmits part of product information (product information corresponding to the above-mentioned product code) from the product information of the PLU file 207 to the label printer 10. Every time the communication interface 111 receives product information of the PLU file 207 transmitted from the store server 20 at predetermined timing, the product information recorded in the PLU file 107 is updated. In other words, the product information recorded in the PLU file 107 is not the newest product information as of now but product information received from the store server 20 before. The above-mentioned update date recorded in the PLU file 107 is information indicating the date on which the product information of the PLU file 107 is updated. In other words, the update date is the date on which the product information of the PLU file 107 is updated with the product information of the PLU file 207 received from the store server 20. In other words, the update date is the receiving date on which the label printer 10 receives the product information of the PLU file 207 from the store server 20. Further, under the condition that at least part of product information, i.e., product information of each product (each product code), is updated in the PLU file 107, the above-mentioned update date is recorded for each product in the PLU file 107. Meanwhile, the store server 20 updates the product information of the PLU file 207 recorded in the memory device 205 of the store server 20. Further, there is a time lag from update of the product information of the PLU file 207 to transmittance of the product information of the PLU file 207 to the label printer 10. As a result, the product information of the PLU file 107 is sometimes different from the product information of the PLU file 207.

The change enabled/disabled setting 108 is setting information indicating if change of the product information is enabled or not when the print device 110 prints the product information. Specifically, the change enabled/disabled setting 108 is setting information indicating if change of the product information received from the store server 20 is enabled or not. It is assumed that the product information received from the store server 20 is the newest product information. Therefore, basically, it is not preferable to change this newest product information. In view of this, the change enabled/disabled setting 108 holds setting information indicating if change of the product information is enabled or not when the print device 110 prints the product information received from the store server 20.

The controller 109 is connected to the display device 13, the touchscreen 14, and the print device 110. The controller 109 controls the various kinds of hardware connected based on commands from the controller device 100.

The print device 110 includes a platen roller and a print head. The platen roller rotates, thereby pulls the label sheet accommodated in the above-mentioned accommodation device out of the above-mentioned accommodation device, and feeds the label sheet. The print head is, for example, a thermal head. The print head prints the above-mentioned product information on a label of the label sheet fed by the platen roller.

The communication interface 111 is an interface for communicating with each device via the network 30 such as an in-store LAN. In other words, the communication interface 111 is an interface for communicating with the store server 20.

The connection interface 112 is an interface for connecting to an external device. For example, the connection interface 112 connects to the handy scanner 40.

Figure 3:
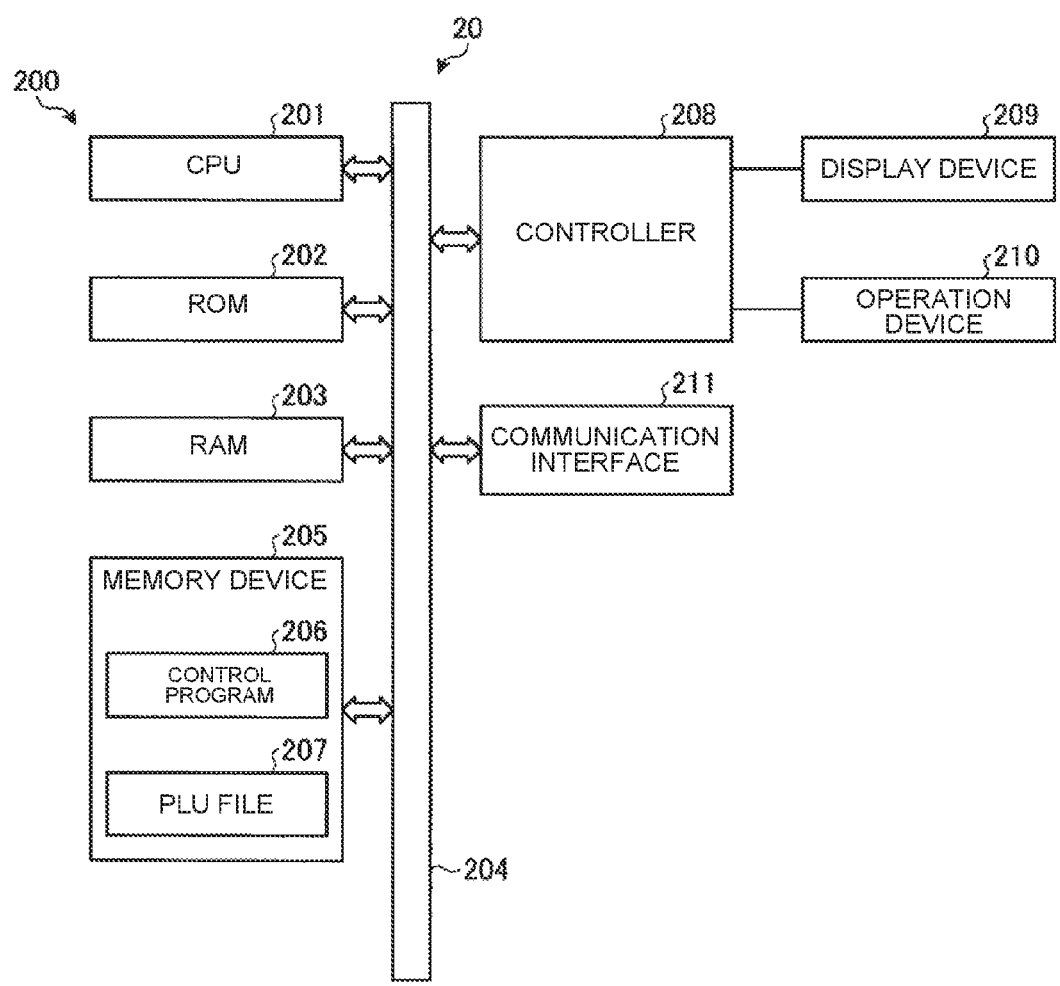
FIG. 3 is a block diagram showing an example of a hardware configuration of the store server of this embodiment.

FIG. 3 is a block diagram showing an example of a hardware configuration of the store server 20. The store server 20 includes the controller device 200 that controls the respective units. The controller device 200 includes the CPU 201, the ROM 202, and the RAM 203. The CPU 201 is connected to the ROM 202 and the RAM 203 via the bus line 204 including an address bus, a data bus, and the like. The CPU 201 decompresses programs, which are recorded in the ROM 202 and the memory device 205, in the RAM 203. The CPU 201 operates based on the programs decompressed in the RAM 203, and thereby controls the store server 20.

The controller device 200 is connected to, via the bus line 204, the memory device 205, the controller 208, and the communication interface 211.

The memory device 205 is a memory device such as an HDD (Hard Disk Drive) or an SSD (Solid State Drive). The memory device 205 may be a nonvolatile memory that records information after power-off such as a flush memory. The memory device 205 records the control program 206 and the like. The control program 206 is a program for realizing the functions of the store server 20. The memory device 205 records the PLU file 207. The product information of the PLU file 207 is transmitted to each system such as the label printer system 1, device, or the like. Therefore, when the price of a product is changed and when a sale or the like is held, a manager of a store or the like edits the product information of the PLU file 207 of the store server 20. In other words, the memory device 205 records the PLU file 207 including the newest product information.

The controller 208 is connected to the display device 209 and the operation device 210. The controller 208 controls the various kinds of hardware connected based on commands from the controller device 200.

The display device 209 is, for example, a liquid crystal display device (LCD). Note that the display device 209 may not be a liquid crystal display device but may be an organic EL display device or another display device. The operation device 210 includes a keyboard, a mouse, and/or other operation devices.

The communication interface 211 is an interface for communicating with each device via the network 30 such as an in-store LAN. In other words, the communication interface 211 is an interface for communicating with the label printer 10.

Figure 4:
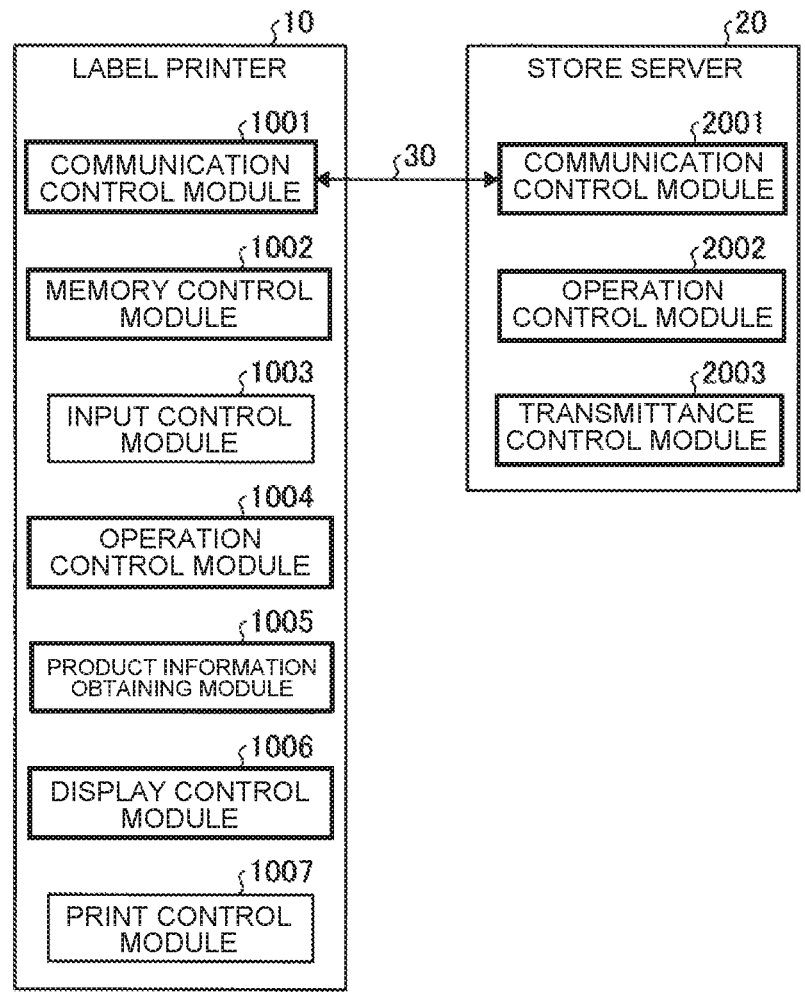
FIG. 4 is a block diagram showing the functional configurations of the devices of the label printer system of this embodiment.

Next, characteristic functions of the devices of the label printer system 1 will be described. FIG. 4 is a block diagram showing the functional configurations of the devices of the label printer system 1.

First, the functional configuration of the label printer 10 will be described. The CPU 101 of the controller device 100 decompresses the control program 106, which is recorded in the memory device 105, in the RAM 103. The CPU 101 operates based on the control program 106, and thereby generates the functional modules of FIG. 4 in the RAM 103. Specifically, the controller device 100 includes, as the functional modules, the communication control module 1001, the memory control module 1002, the input control module 1003, the operation control module 1004, the product information obtaining module 1005, the display control module 1006, and the print control module 1007.

The communication control module 1001 controls the communication interface 111 and thereby communicates with the store server 20 connected to the network 30. Specifically, the communication control module 1001 determines if the communication control module 1001 is capable of communicating with the store server 20 (the communication interface 211) via the communication interface 111 or not. When the communication control module 1001 is capable of communicating with the store server 20, the communication control module 1001 controls the communication interface. Controlled by the communication control module 1001, the communication interface 111 communicates with the store server 20. For example, the communication control module 1001 communicates with the store server 20 via the communication interface 111, and thereby sends a request to transmit product information (described later) to the store server 20. Further, the communication control module 1001 communicates with the store server 20 via the communication interface 111, and thereby receives the product information of the PLU file 207 from the store server 20.

The memory control module 1002 records the product information of the PLU file 207 received from the store server 20 in the PLU file 107 of the memory device 105. Specifically, the memory control module 1002 controls the memory device 105. Controlled by the memory control module 1002, the memory device 105 records the product information of the PLU file 207 in the PLU file 107. As a result, the memory control module 1002 updates the product information of the PLU file 107 that the memory device 105 records.

The input control module 1003, i.e., input means, accepts input of a product code from the handy scanner 40. For example, the input control module 1003 receives a request to input a product code from the product information obtaining module 1005 (described later). In response to the input request, the input control module 1003 controls the handy scanner 40. When the handy scanner 40 reads the above-mentioned code symbol, the input control module 1003 accepts input of the product code. The input control module 1003 may accept input of the product code when the touchscreen 14 detects that numeric keys displayed on the display device 13 or other keys are pressed, instead of the handy scanner 40.

The operation control module 1004 controls the touchscreen 14 of the display device 13, and thereby accepts various operations input in the label printer 10. For example, the operation control module 1004 accepts an operation to request to issue the label 50 from the touchscreen 14. Note that the operation control module 1004 may accept various operations input in the label printer 10 via operation buttons or the like (not shown) of the label printer 10, instead of the touchscreen 14.

The product information obtaining module 1005 obtains product information to be printed on a label. Specifically, under the condition that the operation control module 1004 accepts an operation to request to issue the label 50, the product information obtaining module 1005 sends the above-mentioned input request to request to input a product code of a product, on which the label 50 is to be attached, to the input control module 1003. Further, the product information obtaining module 1005 causes the communication control module 1001 to determine if the label printer 10 (the communication interface 111) is capable of communicating with the store server 20 via the network 30 or not. In other words, the product information obtaining module 1005 causes the communication control module 1001 to determine if the label printer 10 is capable of receiving product information from the store server 20 via the network 30 or not. For example, under the condition that it is determined that the label printer 10 is offline, the communication control module 1001 determines that the label printer 10 is incapable of communicating with the store server 20. The offline status includes a status where the label printer 10 is incapable of communicating with the store server 20, i.e., an external device, because of defects of the network 30, for example. Further, the offline status includes a status where the label printer 10 is incapable of communicating with the store server 20 because the store server 20 is not booted up, for example.

Under the condition that it is determined that the label printer 10 is capable of communicating with the store server 20, the product information obtaining module 1005 causes the communication control module 1001 to send a request to send the product information corresponding to the product code accepted by the input control module 1003. The communication control module 1001 sends a request to send the product information corresponding to the product code to the store server 20 via the communication interface 111. Further, the communication control module 1001, i.e., receiving means, receives the newest product information corresponding to the product code specified in the above-mentioned send request from the store server 20. The product information obtaining module 1005 determines that the product information received by the communication control module 1001 is the product information to be printed on a label. Further, the product information obtaining module 1005 causes the memory control module 1002 to record the product information received from the store server 20 in the PLU file 107 of the memory device 105.

Meanwhile, under the condition that it is determined that the label printer 10 is incapable of communicating with the store server 20, the product information obtaining module 1005 reads the product information, which corresponds to the product code accepted by the input control module 1003, from the PLU file 107 recorded in the memory device 105. In other words, under the condition that the communication control module 1001 is incapable of receiving product information from the store server 20, the product information obtaining module 1005 reads the product information, which corresponds to the product code accepted by the input control module 1003, from the PLU file 107 recorded in the memory device 105. The product information obtaining module 1005 determines that the product information (which is updated when receiving the product information for the last time) read from the PLU file 107 is the product information to be printed on a label.

The display control module 1006 controls the display device 13 to display various kinds of windows on the display device 13. For example, under the condition that the operation control module 1004 accepts an operation to request to issue the label 50, the display control module 1006 displays various kinds of print windows to accept input of operations to print the product information on a label. The display control module 1006, i.e., display control means, displays the product information to be printed on a label on the above-mentioned print window. The product information to be printed on a label is displayed on the above-mentioned print window, in the display mode indicating if the product information is received by the communication control module 1001 or the product information is read from the PLU file 107 of the memory device 105. In other words, the product information to be printed on a label is displayed on the above-mentioned print window, in the display mode indicating the newest product information or the yet-to-be-updated product information. Further, under the condition that the product information received by the communication control module 1001 is displayed, the display control module 1006 displays different print windows depending on the setting information of the change enabled/disabled setting 108.

Figure 5:
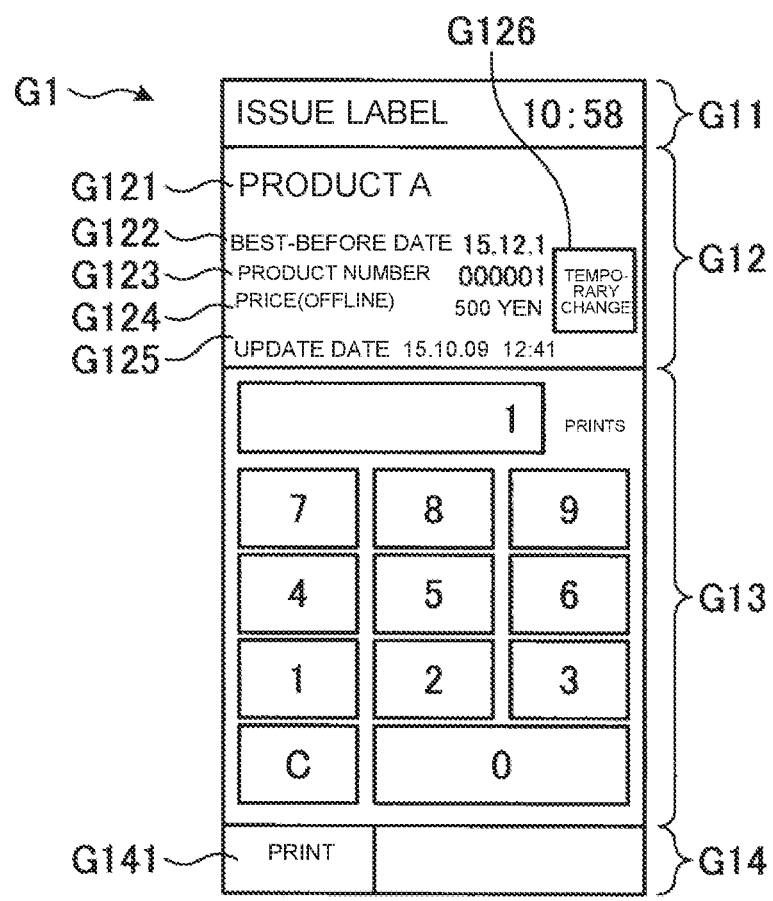
FIG. 5 is a diagram illustrating an example of the offline print window that the label printer of this embodiment displays.

FIG. 5 is a diagram illustrating an example of the offline print window G1, the display control module 1006 causing the display device 13 to display the offline print window G1. Under the condition that the label 50, on which the product information of the PLU file 107 recorded in the memory device 105 is printed, is to be issued, the display control module 1006 causes the display device 13 to display the offline print window G1. Specifically, under the condition that it is determined that the product information is not received from the store server 20, the display control module 1006 causes the display device 13 to display the offline print window G1. In other words, the offline print window G1 is a window for accepting input of an operation to print product information, which is not product information received from the store server 20 but product information of the PLU file 107 recorded in the memory device 105, on a label and to issue the label 50. The offline print window G1 mainly includes the title area G11, the product information display area G12, the number-of-prints input area G13, and the operation display area G14. The title area G11 is an area in which the title and the present time are displayed. In the offline print window G1 of FIG. 5, the title area G11 displays the text "Issue label" as the title, which means to issue the label 50.

The product information display area G12 is an area in which the product information read from the PLU file 107 is displayed. For example, the product information display area G12 includes the product name display area G121, the best-before date display area G122, the product number display area G123, the price display area G124, the update date display area G125, and the temporary change button G126. The product name display area G121 is an area in which the product name is displayed. In the offline print window G1 of FIG. 5, the product name display area G121 displays the text "Product A" as the product name. The best-before date display area G122 is an area in which the best-before date of the product is displayed. In the offline print window G1 of FIG. 5, the best-before date display area G122 displays the text "Best-before date: 15. 12. 1" as the best-before date of the product. The product number display area G123 is an area in which the product number, which indicates the kind of the product, is displayed. In the offline print window G1 of FIG. 5, the product number display area G123 displays the text "Product number: 000001" as the product number indicating the kind of the product. The price display area G124 is an area in which the product price is displayed. In the offline print window G1 of FIG. 5, the price display area G124 displays the text "Price: 500 yen" as the product price. Further, the display control module 1006 displays, in the price display area G124, the text "Offline", which indicates that the product information read from the PLU file 107 of the memory device 105 is displayed. The display control module 1006 highlights the text "Offline", which is displayed in a different color, for example. Note that the text may be highlighted not in a different color but in a different size, in a different font, or in another way. Further, not the text but a mark added, a window in a different color, or another way may indicate that the product information read from the PLU file 107 of the memory device 105 is displayed. The update date display area G125 is an area in which the update date of the product information displayed in the product information display area G12 is displayed. Here, the update date is the date on which the product information of the PLU file 107 is updated with the product information of the PLU file 207. In the offline print window G1 of FIG. 5, the update date display area G125 displays the text "Update date: 15. 10. 09 12:41", for example, as the update date.

The temporary change button G126 is a button pressed by an operator when the product information displayed on the product information display area G12 is to be changed. For example, under the condition that the temporary change button G126 is pressed, the display control module 1006 displays a change window (not shown) for changing the product information. The operation control module 1004, i.e., operation means, accepts operations to change the product information including, for example, the product name, the best-before date, the product number, the price, and the like, in the above-mentioned change window displayed by the display control module 1006. The number-of-prints input area G13 includes the numeric keys and the area in which the number-of-prints is displayed. The numeric keys are used to input the number-of-prints (the number of the labels 50 to be issued). The operation display area G14 includes the print button G141, which is used to print the product information displayed in the product information display area G12 on labels by the number-of-prints displayed in the number-of-prints input area G13.

Figure 6:
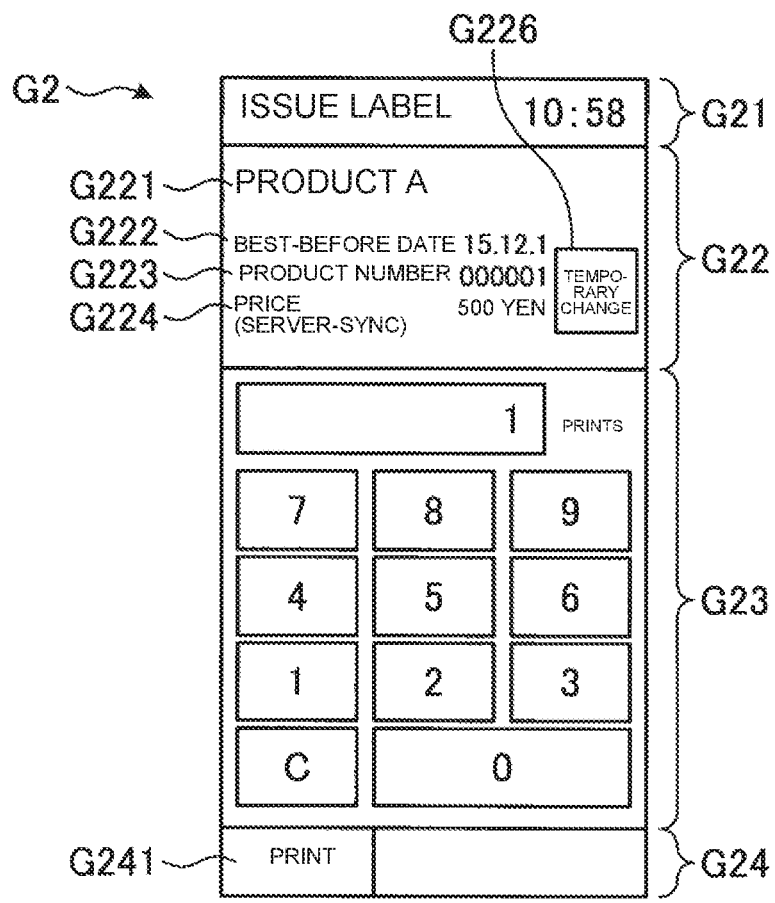
FIG. 6 is a diagram illustrating an example of the server-sync print window that the label printer of this embodiment displays.

FIG. 6 is a diagram illustrating an example of the server-sync print window G2, the display control module 1006 causing the display device 13 to display the server-sync print window G2. Under the condition that the product information is received from the store server 20 and the change enabled/disabled setting 108 indicates that change of the product information is enabled, the display control module 1006 causes the display device 13 to display the server-sync print window G2. The server-sync print window G2 is a window for accepting input of an operation to print product information (product information of the PLU file 207), which is received from the store server 20, on a label and to issue the label 50. In short, the server-sync print window G2 is a window for issuing the label 50 in sync with the store server 20. The server-sync print window G2 includes the title area G21, the product information display area G22, the number-of-prints input area G23, and the operation display area G24. What are displayed in the title area G21, the number-of-prints input area G23, and the operation display area G24 are similar to what are displayed in the title area G11, the number-of-prints input area G13, and the operation display area G14 of the offline print window G1.

The product information display area G22 includes the product name display area G221, the best-before date display area G222, the product number display area G223, the price display area G224, and the temporary change button G226. What are displayed in the product name display area G221, the best-before date display area G222, the product number display area G223, the price display area G224, and the temporary change button G226 are similar to what are displayed in the product name display area G121, the best-before date display area G122, the product number display area G123, the price display area G124, and the temporary change button G126 of the offline print window G1. Note that the server-sync print window G2 includes no display area corresponding to the update date display area G125 of the offline print window G1. In other words, the server-sync print window G2 does not display the update date of the product information of the PLU file 107. This is because the server-sync print window G2 displays the newest product information received from the store server 20. In other words, here, the newest product information is the product information recorded in the PLU file 207 of the store server 20. Further, the display control module 1006 displays, in the price display area G224, the text "Server-sync" instead of the text "Offline". The text "Server-sync" indicates that the newest product information received from the store server 20 is displayed in the product information display area G22 in sync with the store server 20. In other words, the display control module 1006 displays, in the product information display area G22, the newest product information with the text "Server-sync" as the information indicating that the product information displayed in the product information display area G22 is the product information in sync with the store server 20. In other words, the display control module 1006 displays, in the product information display area G22, the text "Server-sync" as the information indicating that the product information displayed in the product information display area G22 is the product information received from the store server 20. Further, in other words, the display control module 1006 displays the text "Server-sync" as the information indicating that the product information displayed in the product information display area G22 is the newest product information. The display control module 1006 highlights the text "Server-sync", which is displayed in a different color, for example.

Figure 7:
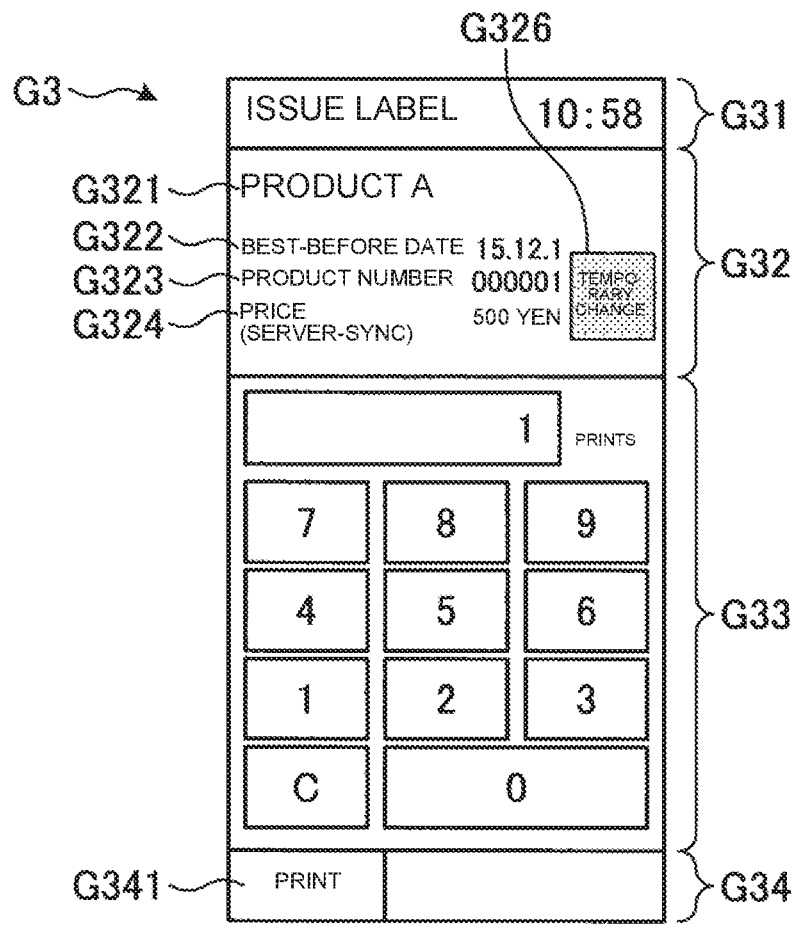
FIG. 7 is a diagram illustrating an example of the change-disabled print window that the label printer of this embodiment displays.

FIG. 7 is a diagram illustrating an example of the change-disabled print window G3, the display control module 1006 causing the display device 13 to display the change-disabled print window G3. Under the condition that the product information is received from the store server 20 and the change enabled/disabled setting 108 indicates that change of the product information is disabled, the display control module 1006 causes the display device 13 to display the change-disabled print window G3. Similar to the server-sync print window G2, the change-disabled print window G3 is a window for accepting input of an operation to print product information (product information of the PLU file 207), which is received from the store server 20, on a label and to issue the label 50. Note that the change-disabled print window G3 is different from the server-sync print window G2 in that change of product information is disabled. The change-disabled print window G3 includes the title area G31, the product information display area G32, the number-of-prints input area G33, and the operation display area G34. What are displayed in the title area G31, the number-of-prints input area G33, and the operation display area G34 are similar to what are displayed in the title area G21, the number-of-prints input area G23, and the operation display area G24 of the server-sync print window G2.

Similar to the server-sync print window G2, the product information display area G32 includes the product name display area G321, the best-before date display area G322, the product number display area G323, the price display area G324, and the temporary change button G326. Note that the temporary change button G326 is, for example, grayed out and disabled. In other words, in the change-disabled print window G3, the operation control module 1004 accepts no operation by an operator to change product information. The grayed-out temporary change button G326 is an example of not accepting an operation to change product information. Acceptance of the above-mentioned operation may be disabled in a different way. For example, the display control module 1006 may not display the temporary change button G326 in the change-disabled print window G3. For example, the display control module 1006 may display, for example, a text or a mark indicating that change of product information is disabled in the change-disabled print window G3, and thereby disable acceptance of an operation to change product information.

The print control module 1007, i.e., print control means, controls the print device 110 to print the product information on a label, and issues the label 50 on which the product information is printed. For example, the print control module 1007 issues the label 50, on which the product information displayed by the display control module 1006 is printed. In other words, the print control module 1007 prints, on a label, the product information displayed on the offline print window G1, the server-sync print window G2, or the change-disabled print window G3 by the display control module 1006, and other information, and issues the label 50. For example, under the condition that the print button G141, G241, or G341 on the offline print window G1, the server-sync print window G2, or the change-disabled print window G3 is pressed, the print control module 1007 prints the product information on labels by the number-of-prints specified in the number-of-prints input area G13, G23, or G33. Under the condition that the operation control module 1004 accepts an operation to change the product information in the change window, the print control module 1007 prints the changed product information on a label and issues the label 50.

Next, the functional configuration of the store server 20 will be described. The CPU 201 of the controller device 200 decompresses the control program 206, which is recorded in the memory device 205, in the RAM 203. The CPU 201 operates based on the control program 206, and thereby generates the functional modules of FIG. 4 in the RAM 203. Specifically, the controller device 200 includes, as the functional modules, the communication control module 2001, the operation control module 2002, and the transmittance control module 2003.

The communication control module 2001 controls the communication interface 211 and thereby communicates with the label printer 10. Specifically, the communication control module 2001 controls the communication interface 211. Controlled by the communication control module 2001, the communication interface 211 communicates with the label printer 10 connected to the network 30. The communication interface 211 communicates with the label printer 10, and thereby receive a request to send product information. The communication interface 211 communicates with the label printer 10, and thereby sends part of the product information of the PLU file 207 or all the product information of the PLU file 207 to the label printer 10. The part of the product information of the PLU file 207 is product information corresponding to the product code specified in the above-mentioned request to send product information.

The operation control module 2002 accepts various operations input in the operation device 210 by an operator. The operation control module 2002 controls the operation device 210. Controlled by the operation control module 2002, the operation device 210 accepts various operations. For example, the operation control module 2002 accepts an operation to change the product information of the PLU file 207 by an operator.

The transmittance control module 2003 controls the communication control module 2001 to send the product information of the PLU file 207 to the label printer 10 at predetermined timing. For example, the transmittance control module 2003 transmits, to the label printer 10, the product information (product information on each product) corresponding to the product code specified in the above-mentioned send request at timing when the communication control module 2001 receives the above-mentioned request to send the product information. In other words, in response to the above-mentioned request to send the product information, the transmittance control module 2003 transmits the product information of the PLU file 207 to the label printer 10. Further, the transmittance control module 2003 may transmit the product information of the PLU file 207 to the label printer 10 at regular intervals. Further, the transmittance control module 2003 may transmit product information (product information on each product or the like) of the PLU file 207, or transmit all the product information of the PLU file 207.

Figure 8:
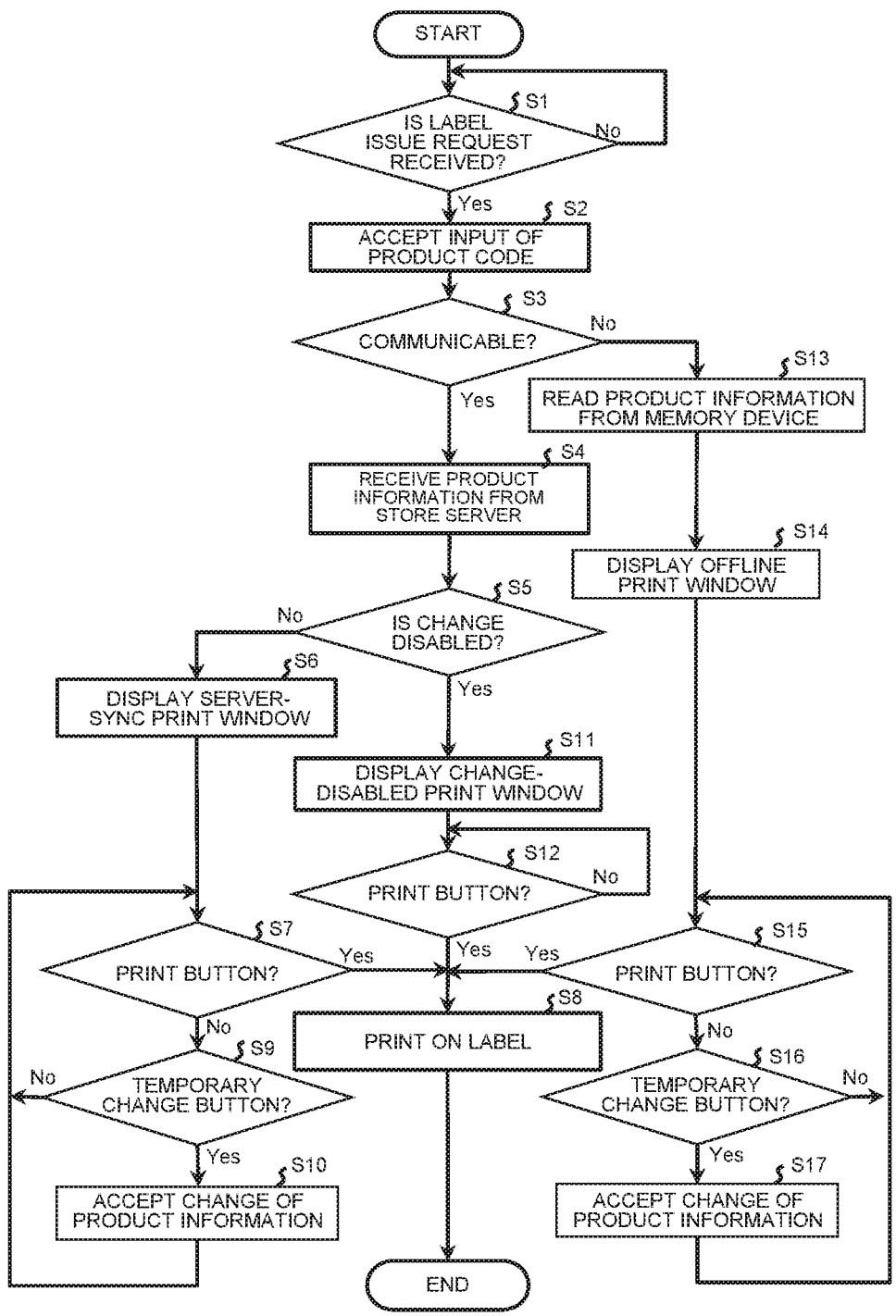
FIG. 8 is a flowchart showing an example of the print process that the label printer of this embodiment executes.

Next, the print process that the label printer 10 executes will be described. FIG. 8 is a flowchart showing an example of the print process that the label printer 10 of this embodiment executes. Note that the print process includes the process of printing product information on a label and issuing the label 50 on which the product information is printed.

First, in Step S1 of FIG. 8, the controller device 100 (the operation control module 1004) of the label printer 10 determines if an operation to request to issue the label 50 is accepted or not. When an operation to request to issue the label 50 is not accepted, (Step S1, No), the controller device 100 stands by until an operation to request to issue the label 50 is accepted. In other words, under the condition that it is determined that an operation to request to issue the label 50 is not accepted, the controller device 100 stands by until an operation to request to issue the label 50 is accepted.

When an operation to request to issue the label 50 is accepted, (Step S1, Yes), the process of the controller device 100 proceeds to Step S2. In Step S2, the controller device 100 (the input control module 1003) accepts input of the product code corresponding to the product, on which the label 50 is to be attached, via the handy scanner 40, for example. In other words, under the condition that it is determined that an operation to request to issue the label 50 is accepted, the input control module 1003 accepts input of the product code corresponding to the product, on which the label 50 is to be attached.

Next, in Step S3, the controller device 100 (the communication control module 1001) determines if the label printer 10 (the communication interface 111) is capable of communicating with the store server 20 or not. In other words, the controller device 100 determines if the label printer 10 is capable of receiving product information from the store server 20 or not. When it is determined that the label printer 10 is capable of communicating with the store server 20 (Step S3, Yes), the process of the controller device 100 proceeds to Step S4. In Step S4, the controller device 100 (the communication control module 1001) receives the product information of the above-mentioned product code (see Step S2) from the store server 20. In other words, under the condition that the label printer 10 is capable of communicating with the store server 20, the communication control module 1001 receives the product information from the store server 20. More specifically, in order to receive the product information from the store server 20, the communication control module 1001 sends the above-mentioned request to send the product information of the above-mentioned product code to the store server 20. Further, the communication control module 1001 receives the product information from the store server 20 as a response for the above-mentioned send request.

Next, in Step S5, the controller device 100 (the display control module 1006) of the label printer 10 determines if change of product information is disabled or not based on the setting information of the change enabled/disabled setting 108. Note that, in the determining process, the product information is the product information received from the store server 20.

When it is determined that change of product information is enabled (Step S5, No), the process of the controller device 100 proceeds to Step S6. In Step S6, the controller device 100 (the display control module 1006) displays the server-sync print window G2 of FIG. 7. In other words, under the condition that it is determined that change of product information is enabled, the display control module 1006 displays the server-sync print window G2.

Next, in Step S7, the controller device 100 (the operation control module 1004) determines if the print button G241 in the server-sync print window G2 pressed is detected or not. When it is determined that the print button G241 pressed is detected (Step S7, Yes), the process of the controller device 100 proceeds to Step S8. In Step S8, the controller device 100 (the print control module 1007) prints the product information on a label and issues the label 50. In other words, under the condition that it is determined that the print button G241 in the server-sync print window G2 pressed is detected, the print control module 1007 executes the print process.

Meanwhile, when it is determined that the print button G241 pressed is not detected (Step S7, No), the process of the controller device 100 proceeds to Step S9. In Step S9, the controller device 100 (the operation control module 1004) determines if the temporary change button G226 pressed is detected or not. In other words, under the condition that it is determined that the print button G241 pressed is not detected, the operation control module 1004 determines if the temporary change button G226 pressed is detected or not.

When it is determined that the temporary change button G226 pressed is detected (Step S9, Yes), the process of the controller device 100 proceeds to Step S10. In Step S10, the controller device 100 (the operation control module 1004) accepts an input to change the product information in the change window for changing the product information. In other words, under the condition that it is determined that the temporary change button G226 pressed is detected, the operation control module 1004 accepts an input to change the product information in the change window for changing the product information. Further, when it is determined that the temporary change button G226 pressed is not detected (Step S9, No), the process of the controller device 100 returns to Step S7. In other words, under the condition that it is determined that the temporary change button G226 pressed is not detected, the controller device 100 executes the process of Step S7 again.

Meanwhile, when it is determined that change of product information is disabled (Step S5, Yes), the process of the controller device 100 proceeds to Step S11. In Step S11, the controller device 100 (the display control module 1006) displays the change-disabled print window G3 of FIG. 7. In other words, under the condition that it is determined that change of product information is disabled, the display control module 1006 displays the change-disabled print window G3.

Next, in Step S12, the controller device 100 (the operation control module 1004) determines if the print button G341 in the change-disabled print window G3 pressed is detected or not. When it is determined that the print button G341 pressed is not detected (Step S12, No), the operation control module 1004 stands by until the print button G341 pressed is detected. In other words, under the condition that it is determined that the print button G341 pressed is not detected, the operation control module 1004 stands by until the print button G341 pressed is detected.

Meanwhile, when it is determined that the print button G341 pressed is detected (Step S12, Yes), the process of the controller device 100 proceeds to Step S8. In Step S8, the controller device 100 (the print control module 1007) prints the product information on a label and issues the label 50, as described above. In other words, under the condition that it is determined that the print button G341 in the change-disabled print window G3 pressed is detected, the print control module 1007 executes the print process.

Meanwhile, when it is determined that the label printer is incapable of communicating with the store server 20 (Step S3, No), the process of the controller device 100 proceeds to Step S13. In Step S13, the controller device 100 (the memory control module 1002) reads the product information corresponding to the above-mentioned product code (see Step S2) from the PLU file 107 recorded in the memory device 105. In other words, under the condition that it is determined that the label printer 10 is incapable of communicating with the store server 20, the memory control module 1002 reads the product information from the PLU file 107 recorded in the memory device 105.

Next, in Step S14, the controller device 100 (the display control module 1006) displays the offline print window G1 of FIG. 5.

Next, in Step S15, the controller device 100 (the operation control module 1004) determines if the print button G141 in the offline print window G1 pressed is detected or not. When it is determined that the print button G141 pressed is not detected (Step S15, No), the process of the controller device 100 proceeds to Step S16. In Step S16, the controller device 100 (the operation control module 1004) determines if the temporary change button G126 pressed is detected or not. In other words, under the condition that it is determined that the print button G141 in the offline print window G1 pressed is not detected, the operation control module 1004 determines if the temporary change button G126 in the offline print window G1 pressed is detected or not.

When it is determined that the temporary change button G126 pressed is detected (Step S16, Yes), the process of the controller device 100 proceeds to Step S17. In Step S17, the controller device 100 (the operation control module 1004) accepts an input to change the product information in the change window for changing the product information. In other words, under the condition that it is determined that the temporary change button G126 in the offline print window G1 pressed is detected, the operation control module 1004 accepts an input to change the product information in the change window for changing the product information. Meanwhile, when it is determined that the temporary change button G126 pressed is not detected (Step S16, No), the process of the controller device 100 returns to Step S15. In other words, under the condition that it is determined that the temporary change button G126 pressed is not detected, the controller device 100 executes the process of Step S15 again.

Meanwhile, when it is determined that the print button G141 in the offline print window G1 pressed is detected (Step S15, Yes), the process of the controller device 100 proceeds to Step S8. In Step S8, the controller device 100 (the print control module 1007) prints the product information on a label and issues the label 50, as described above. In other words, under the condition that it is determined that the print button G141 on the offline print window G1 pressed is detected, the print control module 1007 executes the print process.

Executing the process of Step S8 by the controller device 100 is the end of the print process.

As described above, according to the label printer 10 of this embodiment, the controller device 100 (the input control module 1003) accepts an input of the product code of the product, on which the label 50 is to be attached, via an input device (for example, the handy scanner 40). The controller device 100 (the communication control module 1001) determines if the label printer 10 is capable of receiving product information from the store server 20 or not. Under the condition that it is determined that the label printer 10 is incapable of receiving product information from the store server 20, the controller device 100 (the product information obtaining module 1005) reads the product information, which is updated when receiving the product information for the last time, from the PLU file 107 recorded in the memory device 105. The controller device 100 (the display control module 1006) displays the offline print window G1, in the display mode indicating that the product-information-to-be-printed is product information read from the PLU file 107 of the memory device 105, which may be recognized by an operator. In other words, when the communication interface 111 is incapable of receiving product information from the store server 20, the controller device 100 displays the offline print window G1, in the display mode indicating that the product-information-to-be-printed is product information of the memory device 105, the product information being received and updated before, which may be recognized by an operator. The controller device 100 (the print control module 1007) prints the product information displayed on the offline print window G1 on a label. Therefore, according to the label printer 10 of this embodiment, an operator may recognize if the product information to be printed on a label is read from the memory device 105.

The programs executed by the devices of the above-mentioned embodiment and modification examples are pre-installed in the recording mediums (ROMs or memory devices) of the devices and provided. However, the above-mentioned programs may be provided in different ways. For example, the above-mentioned programs in installable format files or executable format files may be recorded in computer readable recording media such as CD-ROMs, flexible disks (FDs), CD-Rs, and DVDs (Digital Versatile Disks) and provided. Further, a recording medium may not be a medium independent of a computer or an embedded system. For example, examples of a recording medium include a recording medium, which records or temporarily records a program transmitted via a LAN or the Internet and downloaded.

Further, the programs executed by the devices of the above-mentioned embodiment and modification examples may be stored in a computer connected to a network such as the Internet, downloaded via the network, and provided. Further, the above-mentioned programs may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer, comprising:
   an input device that inputs a product code for identifying a product;
   a communication interface that receives product information from an external device, the product information including information on the product;
   a memory device that records the product information corresponding to the product code, at any one of an input timing when the input device inputs the product code and a predetermined timing other than the input timing in a case where the communication interface is capable of receiving the product information corresponding to the product code, the product information being received from the external device via the communication interface;
   a print device that prints the product information on a recording medium, the product information corresponding to the product code input from the input device;
   a display device that displays one of the product information received via the communication interface and the product information recorded in the memory device, as product-information-to-be-printed to be printed by the print device; and
   a controller device that
      reads, when the communication interface is incapable of receiving the product information from the external device, the product information corresponding to the product code input from the input device, from the memory device, wherein the read product information was previously recorded in the memory at the predetermined timing in the case where the communication interface was capable of receiving the product information corresponding to the product code,
      controls the display device to display the read product information as the product-information-to-be-printed, in a display mode indicating that the product-information-to-be-printed is product information recorded in the memory device, and controls the print device to print the product information displayed on the display device.

2. The printer according to claim 1, wherein
when the communication interface is capable of receiving the product information from the external device, the controller device
   receives the product information from the external device via the communication interface, the product information corresponding to the product code input from the input device, and
   controls the display device to display the received product information as the product-information-to-be-printed.

3. The printer according to claim 2, wherein
the controller device controls the display device to display the product-information-to-be-printed with information indicating if the product-information-to-be-printed is the product information received via the communication interface or the product information recorded in the memory device.

4. The printer according to claim 3, wherein
when the product-information-to-be-printed is the product information received via the communication interface, the controller device controls the display device to display the product-information-to-be-printed with text information indicating that the printer is in sync with the external device, and
when the product-information-to-be-printed is the product information recorded in the memory device, the controller device controls the display device to display the product-information-to-be-printed with text information indicating that the printer is incapable of communicating with the external device.

5. The printer according to claim 2, wherein
the controller device further controls the display device to display the product-information-to-be-printed with an operation button for accepting an operation to change the product-information-to-be-printed.

6. The printer according to claim 5, wherein
the memory device further records, previously, change enabled/disabled setting indicating if change of the product-information-to-be-printed is enabled or disabled.

7. The printer according to claim 6, wherein
when the communication interface is capable of receiving the product information from the external device, the controller device determines if change of the product-information-to-be-printed is enabled or disabled on the basis of setting information of the change enabled/disabled setting.

8. The printer according to claim 7, wherein
when it is determined that change of the product-information-to-be-printed is enabled, the controller device controls the display device to display the product information received from the external device with the operation button.

9. The printer according to claim 1, wherein
when the communication interface is incapable of receiving the product information from the external device, the controller device controls the display device to display the product information recorded in the memory device with update date of the product information recorded in the memory device.

10. The printer according to claim 9, wherein
the memory device records the update date and the product information, the update date of the product information being the date of receiving the product information from the external device via the communication interface.

11. The printer according to claim 9, wherein
when the communication interface is incapable of receiving the product information from the external device, the controller device controls the display device to display the read product information as the product-information-to-be-printed, in a display mode indicating the update date of the product information.

\* \* \* \* \*